United States Patent Office 3,203,941
Patented Aug. 31, 1965

3,203,941
ACCELERATED ANAEROBIC CURING COMPOSITIONS CONTAINING A CATALYST SYSTEM OF PEROXIDES AND POLYAMINO COMPOUNDS
Vernon K. Krieble, Hartford, Conn., assignor to Loctite Corporation, a corporation of Connecticut
No Drawing. Filed Apr. 2, 1962, Ser. No. 184,525
17 Claims. (Cl. 260—89.5)

The present invention relates to accelerated anaerobic curing systems and methods utilizing polymerizable sealant compounds having the following general formula:

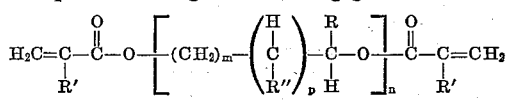

where R is a member selected from the class consisting of hydrogen, —$CH_3$, —$C_2H_5$, —$CH_2OH$ and

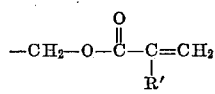

radicals, R' is a member selected from the class consisting of hydrogen, chlorine and methyl and ethyl radicals, R" is a member selected from the class consisting of hydrogen, —OH radical and

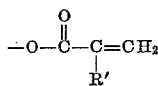

radical; $m$ is an integer equal to at least 1, e.g. from 1 to 8 or higher, for instance from 1 to 4, inclusive; $n$ is an integer equal to at least 1, for example 1 to 20 or more; and $p$ is one of the following: 0, 1.

This application is a continuation-in-part of my earlier filed application Serial No. 120,960, filed June 30, 1961, now abandoned.

In my United States Patent No. 2,895,950, issued July 21, 1959, I have disclosed an anaerobic curing composition utilizing monomers within the foregoing formula which rapidly and spontaneously polymerize to the solid state in the presence of certain organic hydroperoxide catalysts upon the exclusion of air or oxygen from the composition. In addition to anaerobic curing characteristics, my patented compositions provide the additional advantage of long shelf life in the liquid state so long as contact with air is maintained, which feature is particularly useful in the bonding or adhering of adjacent surfaces since the composition can be stored or permitted to stand in contact with air for extended periods of time without polymerization. However, when it is deposited or placed between adjacent surfaces, the resulting exclusion of air produces polymerization of the composition to form a strong bond between the adjacent surfaces.

As stated in my aforementioned patent, conventional accelerators such as tertiary amines, ascorbic acid, organic phosphites and quaternary ammonium salts may be included to reduce the amount of hydroperoxide catalyst required or to enable use of catalysts having a lesser percentage of oxygenation. Such accelerators have proven beneficial in practice and have been extensively used.

As a result of increasing usage of these resinous compositions in assembly-line fabrication of various types of equipment, there has arisen an increasing demand for compositions which would rapidly set upon assembly, particularly without the need for the application of heat. Although the mixtures of my above-identified patent as modified by various accelerator compounds heretofore utilized have provided rapid curing characteristics upon the assembling of the parts and without heating, there has been a continuing demand for still more rapidly curing compositions which would provide a high measure of strength within a matter of minutes after assembly and without the use of heat as described above.

It is an aim of the present invention to provide an accelerated anaerobic curing resin system wherein the resin-catalyst mixture will not polymerize in the presence of air but will set very rapidly in the absence of air to form a strong bond between adjacent surfaces.

It is also an aim of the present invention to provide an accelerator composition which may be separately applied to one or both of adjacent surfaces to be bonded and which will cause a subsequently applied coating of a catalyst-monomer mixture of my above-described patent to set very rapidly upon contact therewith.

Another aim is to provide such accelerator compositions which may be stored for extended periods of time without deterioration or substantial loss in effectiveness.

A still further aim is to provide methods for the rapid curing at room temperature of a catalyst-monomer mixture of my above-identified patent upon inclusion between adjacent surfaces in the absence of air.

I have now found that the anaerobic polymerization of substantially unoxygenated monomers corresponding to the general formula:

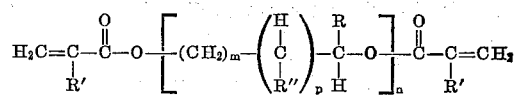

wherein R, R', R", $m$, $n$, and $p$ have the meanings heretofore set forth, in the presence of catalysts capable of polymerizing said monomer upon the exclusion of oxygen, can be greatly accelerated by admixture with a polyamino compound corresponding to the general formula:

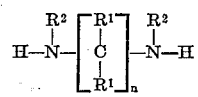

wherein $R^1$ is selected from the class consisting of hydrogen and unsubstituted alkyl groups, $R^2$ is selected from the class consisting of hydrogen, alkyl and substituted alkyl groups, and $n$ is an integer equal to 2 or 3. I have further found that the accelerating effect of the polyamino compound can be greatly enhanced by the inclusion therewith of an organic acid within certain amounts, as will be pointed out more in detail hereinafter.

Although the polyamino compound may in some instances be admixed with the catalyst-monomer sealant composition shortly before application to and assembly of the parts, it is most desirably employed in a separate formulation preliminarily applied to one or both of the surfaces to be placed in adjacent relationship and then subsequently admixed with the catalyst-monomer sealant composition in situ. It has been found that the polyamino compound tends to greatly affect the air stability of my patented compositions, especially under commercial and industrial conditions. By separately applying the components of the system, the desired admixture is obtained in situ without adversely affecting the stability of the catalyst-monomer composition.

Accordingly, the preferred aspect of the present invention resides in the utilization of a separate accelerator formulation containing the polyamino compound in a volatile organic carrier which most desirably exhibits good cleaning properties for the surfaces of the parts to be joined. The preferred accelerator formulations are rendered free from deterioration and stable for extended periods by the incorporation of a small amount of a dihydric alcohol and preferably contain organic acid for optimum efficacy. They may also contain a heavy metal ion for activating properties as will be pointed out more in detail hereinafter.

Referring first in detail to the monomer-catalyst component of my accelerated anaerobic curing system, the term "unoxygenated" as used herein and in the claims refers to unmodified monomers corresponding to the above formula as distinguished from the "oxygenated" monomers of United States Patent No. 2,628,178 which are prepared by passing oxygen through the monomer for an extended period of time.

Exemplary of the monomers which may be utilized in the compositions of the present invention are the following: diethylene glycol dimethacrylate, triethylene glycol dimethacrylate, tetraethylene glycol dimethacrylate, dipropylene glycol dimethacrylate, polyethylene glycol dimethacrylate, di-(pentamethylene glycol) dimethacrylate, tetraethylene glycol diacrylate, tetraethylene glycol di-(chloroacrylate), diglycerol diacrylate, diglycerol tetramethacrylate, tetramethylene dimethacrylate and ethylene dimethacrylate. The foregoing monomers need not be in the pure state but may comprise commercial grade in which inhibitors or stabilizers are included.

As in my aforementioned patent, it is within the scope of the present invention to obtain modified characteristics for the cured composition by the utilization of one or more monomers within the above formula with other unsaturated monomers such as unsaturated hydrocarbons or unsaturated esters.

In my aforementioned patent, I have described and claimed the use of certain non-polymerizing organic hydroperoxides in which the atoms directly linked to the carbon atom bearing the hydroperoxide radical are selected from the group consisting of carbon, hydrogen, nitrogen or oxygen, and in such cases where all of the said directly linked atoms are carbon, not more than two of said carbon atoms comprise the carbon atom of a methyl group. Some of these hydroperoxide catalysts may be produced readily by direct substitution, and others are produced by oxygenation of compounds in the liquid phase particularly by passing oxygen or an oxygen-containing gas through the compounds, preferably ethers, ketones and hydrocarbons. These catalysts have been found to be latent initiators of polymerization of the aforesaid monomers and their mixture with the monomer is highly sensitive to contact with air so that the catalyst remains inactive or ineffective in the presence of oxygen but upon exclusion therefrom will initiate polymerization of the monomer. Further details concerning the preparation and specific examples of such hydroperoxide catalysts can be readily obtained from the specification of my aforementioned patent.

In the copending application of Robert H. Krieble, Serial No. 62,531, filed October 14, 1960, now Patent No. 3,043,820, it is disclosed that the incorporation of quinones in my patented composition will impart extended shelf stability in the presence of oxygen to admixtures of the above monomers with the entire class of organic hydroperoxides and with hydrogen peroxide (concentrated, about 90 percent by weight).

However, due to the factors of activity, problems in handling, and retention of activity upon storage for prolonged periods of time, the preferred catalysts of my invention are those defined in my above-identified patent.

Generally, as little as 0.1 percent by weight of hydroperoxide catalyst may be employed in the system; however, it is preferable to utilize about 0.5 to 8.0 percent by weight dependent upon the activity of the particular monomer to obtain optimum speed in curing and most desirable storage characteristics. Amounts of catalyst in excess of 20 percent by weight produce no additional beneficial effect and have a tendency to act as a diluent for the cured composition.

The polyamino accelerators of my present invention produce a significant effect in amounts as low as 0.01 percent by weight of the sealant system or monomer-catalyst formulation, and amounts up to 10.0 percent by weight may be employed, albeit with almost instantaneous curing with some monomers and accelerators. Preferably, the polyamino accelerator should constitute about 0.1–2.0 percent by weight of the sealant system for optimum activity and ease of handling, depending upon the activity of the monomer-catalyst formulation and upon the activity of the particular polyamino compounds.

Indicative of the effect of varying the concentration of polyamino accelerator is Table 1 wherein a few drops of a system containing 7 percent by weight cumene hydroperoxide, tetraethylene glycol dimethacrylate and varying amounts of 1,2-propane diamine were placed upon the threads of 3/8 inch nuts and bolts which were tightened and allowed to set at room temperature for the indicated intervals. The prevailing torque developed by the several mixtures was then determined by a procedure which will be explained hereinafter.

TABLE 1

| Amount of accelerator, percent by wt. of sealant system | Time of cure, minutes | Prevailing torque, foot pounds |
| --- | --- | --- |
| 0.1 | 20 | 1 |
| 0.1 | 35 | 6 |
| 0.5 | 20 | 7.5 |
| 0.5 | 35 | 12.6 |
| 1.0 | 20 | 10.5 |

Exemplary of the polyamino compounds of the present invention are 1,2-propane diamine; 1,3-propane diamine; N,N-diethyl 1,3-propane diamine; tetraethylene pentamine, triethylene tetramine; N-(3-aminopropane) 1,3-propane diamine; ethylene diamine; and N-(2-ethanol) ethylene diamine.

The preferred polyamino compounds of the general formula for greatest activity are those wherein $n$ is equal to 2. Specific examples of such preferred compounds are 1,2-propane diamine and ethylene diamine.

It has further been found that the accelerating activity of the polyamino compounds is further greatly enhanced by the incorporation therewith of an organic acid. Even small amounts of acid, i.e. 10 percent of the acid equivalent of the polyamine, produce a significant effect. It is believed that the organic acid forms the ammonium salt of the amine which is desirable in that there is generally lesser toxicity and volatility, which factors are particularly significant when the accelerator is applied to the surface of the parts well in advance of assembly so as to develop and maintain a film upon the surface to be bonded. The acid may be used in amounts up to 4 acid equivalents of the polyamino compounds.

Generally, the enhancement afforded by the organic acid increases sharply until the full acid equivalent of the polyamino compound is present, after which the enhancement afforded by increasing amounts produces no significant additional benefit and may introduce problems of corrosion.

Accordingly, the organic acid is preferably employed in amounts of about 0.5–1.5 acid equivalents of the polyamino compound for optimum effectiveness. Indicative of the effect of varying the ratio of organic acid to polyamino accelerator is Table Two wherein the nuts and bolts were initially washed in a formulation containing varying amounts of 1,2-propane diamine and 2-ethyl hexanoic acid dissolved in 30 cc. isopropyl alcohol and 65 cc. trichloroethylene. The nuts and bolts were dried, and then a few drops of a sealant composition containing 7.0 percent by weight cumene hydroperoxide, 2.0 percent by weight triethylamine and tetraethylene glycol dimethacrylate were placed on the threads, and the nuts and bolts assembled. After the indicated period of time, the prevailing torque of the sealant system was determined.

TABLE 2

| Accelerator, percent by volume | Acid, acid equivalents | Time, minutes | Torque, foot pounds |
|---|---|---|---|
| *0.35 | | 5 | 1 |
| *0.35 | | 10 | 2½ |
| 0.35 | 1 | 5 | 9 |
| 0.35 | 1 | 10 | 15 |
| 0.75 | 1 | 5 | 14½ |
| 0.75 | 2 | 5 | 18 |

* Accelerator (no acid)—dissolved in trichloroethylene with no alcohol to 100 cc. volume.

Exemplary of the organic acids which may be employed are 2-ethyl hexanoic, formic, acetic, propionic, hexanoic, 2-methyl hexanoic, 5-methyl hexanoic, naphthenic, lauric, linoleic and butyric.

Although the polyamine may be admixed directly with the monomer-catalyst mixture prior to application to the surface of the parts, it has been found that the intermixing of the two components of the accelerated sealant system is not desirable if the compositions are not to be used within a relatively short time after intermixing. The polyamino compound has been noted to interfere materially with or totally destroy the air-stability of the basic sealant formulation so that it will no longer be shelf stable for extended periods of time in the presence of oxygen, particularly under commercial or industrial conditions. Generally, it has been also noted that the polyamino compound loses its effectiveness over a period of time when admixed into the basic sealant formulation so that a pronounced decrease in efficiency may be noted in as little as twenty-four hours.

Moreover, if the polyamino compounds of the present invention are intermixed with the basic sealant composition prior to application to the mating surfaces, other accelerators should not be included therein since the effectiveness of the polyamino compounds is generally reduced thereby and the air-stability is destroyed for most purposes.

Accordingly, to maintain continuing activity and air-stability of the sealant composition, the most desirable aspect of the present invention resides in the application of the polyamino accelerator (and its acid mixture) initially to one or both of the adjacent mating surfaces to be bonded before application of the monomer-catalyst formulation. In this manner, the two components of the system will intermix in situ and thus avoid the aforementioned problems resultant from intermixing the polyamino compound in the monomer-catalyst composition prior to application to the surfaces to be bonded.

Generally, the polyamines are dissolved in a suitable organic vehicle which will evaporate readily to leave a thin film of the polyamine behind. By use of grease-cutting solvents as at least a portion of the vehicle, the organic vehicle may serve the additional function of cleaning the surface of the parts so as to provide a clean surafce. This is particularly advantageous since a film of grease or dirt may seriously interfere with the subsequent polymerization of the sealant system.

I have found that small amounts of dihydric alcohols (glycols) will provide greatly enhanced stability to the solution of the polyamino compound in the organic vehicle. Generally, as little as about 0.25 percent by weight will provide a significant increase in stability. Amounts in excess of about 10.0 percent by weight tend to deposit on the parts a non-volatile film of sufficient thickness to interfere with the ability of the sealant composition subsequently to flow about the adjacent surfaces and to cure in contact with the underlying metal surfaces. Accordingly, the accelerator formulation preferably contains 0.5–7.5 percent by weight of dihydric alcohols (glycols), and most desirably 1.0–5.0 percent. Ethylene glycol and 1,2-propylene glycol have proven particularly advantageous although other higher molecular weight glycols may be utilized including butylene glycol, polyethylene glycol and pentanediol.

Although the theory of operation for the dihydric alcohol is not fully understood, it is believed that the dihydric alcohol forms a coordination complex with the amine groups of the polyamino compound to limit their activity with contaminants in the accelerator as formulated or which may thereafter enter thereinto. The dihydric alcohols have proven especially effective when a heavy metal salt has been incorporated in the formulation and when a halogenated grease solvent has been utilized in the organic vehicle.

I have also found that low molecular weight monohydric alcohols increase the wetting properties of the accelerator formulation and appear to provide some increases in stability for the formulation. The monohydric alcohols also are most valuable in increasing the solubility of the dihydric alcohols in various organic solvents such as the halogenated hydrocarbons.

The monohydric alcohols will provide significant benefit in amounts as little as 1.0 percent by weight and may constitute substantially the entire vehicle if so desired. The preferred compositions contain at least 10.0 percent by weight and most desirably at least 20.0 percent by weight of the monohydric alcohol.

Since a quickly volatilizing vehicle is desired, the monohydric alcohols should be of low molecular weight. In this respect, alcohols having 1 to 5 carbon atoms have proven satisfactory including methyl alcohol, ethyl alcohol, n-propanol, isopropanol, n-butanol, isobutanol, tertiary butanol, isopentanol, and tertiary pentanol. When butanols and pentanols are employed, the percentage by weight should be less than about 50, and a fast evaporating solvent should be employed as the remainder of the vehicle so as to provide sufficient volatility. For some applications, methanol may be undesirable because of its flammability, excessive volatility and toxicity.

To obtain optimum grease cutting characteristics in the formulation together with other desired properties such as optimum volatility, cost and low flammability, highly active and volatile grease solvents may be employed as a substantial percentage of the formulation. The preferred grease solvents are non-flammable and include the halogenated hydrocarbons such as trichloroethylene, perchloroethylene, teterachloroethylene, tetrachlorethane and methylene chloride, although flammable solvents may also be employed including solvent naphthas such as Stoddard's solvents (200–400° F.) and aromatic hydrocarbons such as the xylenes.

Indicative of the stability of formulations employing various ratios of dihydric alcohol to chlorinated grease solvent are the data in the following Table 3 wherein formulations containing 1.36 cc. 1,2-propane diamine, 3.0 cc. 2-ethyl hexanoic acid and 0.37 cc. basic cupric carbonate in various organic vehicles were aged in an oven at 60° C. In this accelerated aging test, stability for one day is equal to stability for about sixteen days at ambient temperatures.

TABLE 3

| ORGANIC VEHICLE | STABILITY, Days to Failure |
| --- | --- |
| 3.3 cc. Trichloroethylene, 2.0 cc. Propylene Glycol. | 58. |
| 93.3 cc. Trichloroethylene, 2.0 cc. Propylene Glycol. | 21. |
| 90.0 cc. Trichloroethylene, 5.0 cc. Propylene Glycol. | 67. |
| 190.0 cc. Trichloroethylene, 5.0 cc. Propylene Glycol. | 21. |
| 385.0 cc. Trichloroethylene, 10.0 cc. Propylene Glycol. | 16. |
| 385.0 cc. Trichloroethylene, 10.0 cc. Propylene Glycol*. | 83. |
| 96.0 cc. Trichloroethylene, 4.0 cc. Propylene Glycol. | 42. |
| 86.0 cc. Trichloroethylene, 10.0 cc. Butanol, 4.0 cc. Propylene Glycol. | Turned dark in 37 days, precipitated in 55 days. |
| 76.0 cc. Trichloroethylene, 20.0 cc. Butanol, 4.0 cc. Propylene Glycol. | Turned dark after 55 days but no precipitation or separation. |
| 66.0 cc. Trichloroethylene, 30.0 cc. Butanol, 4.0 cc. Propylene Glycol. | No change in color or deterioration after 55 days. |

*Without the basic copper carbonate.

The polyamino compound is best employed in dilute concentrations in such organic vehicles since the more concentrated solutions apparently tend to develop a relatively thick film which shields the metal surface so as to reduce the speed of the system when the monomer-catalyst mixture is subsequently brought into contact. The polyamino compound produces a significant effect in concentrations as little as 0.05 percent by weight and may be used in concentrations as great as 10.0 percent by weight subject to the above effect. The preferred solutions utilize 0.5–2.5 percent by weight of the polyamino compound in conjunction with an organic acid.

Indicative of the effect of varying the concentration of the polyamino compound in such a pretreating composition is Table 4 wherein the nuts and bolts were initially washed in formulations containing the indicated amounts of 1,2-propane diamine and 2-ethyl hexanoic acid in trichloroethylene before application of a few drops of a monomer-catalyst mixture as in Tables 1 and 2.

TABLE 4

| Accelerator, percent by volume | Acid, percent by volume | Torque, foot pounds |
| --- | --- | --- |
| 5.0 | 10.0 | 6¼ |
| 2.5 | 5.0 | 13 |
| 1.25 | 2.5 | 15½ |

In addition to the polyamine and organic acid, it may be desirable to include a polyvalent heavy metal ion as an activator. Although most metals will catalyze the cure of the sealant composition, certain metals, and notably cadmium and zinc, do not always exhibit this catalytic effect. Accordingly, the inclusion of a polyvalent metal ion in the pretreating compositions may be desirable in small amounts of 0.05–1.0 percent by weight. Among the various compounds which may be employed are copper carbonate, ferric chloride, and cobalt, manganese, lead, copper and iron soaps. The inclusion of such compounds tends to reduce the stability of the accelerator formulation, and accordingly it may be necessary to use greater percentages of the dihydric alcohol than in formulations without the metal ion.

The following is a specific formulation of a pretreating accelerator composition which has proven highly effective in combination with the monomer-catalyst mixture of my patent.

| Component: | Amount, cc. |
| --- | --- |
| 1,2-propane diamine | 0.5 |
| 2-ethyl hexanoic acid | 1.4 |
| Butanol | 30.0 |
| 1,2-propylene glycol | 3.0 |
| Trichloroethylene | 65.1 |
| | 100.0 |

If it is desired to utilize the above accelerator formulations as an activator as well, I include 0.18 gram of basic cupric carbonate.

This pretreating composition may be applied to one or both of the surfaces to be placed in adjacent relationship by tumbling, brushing or spraying, and the parts are then allowed to dry for a few minutes. Aerosol dispensers have proven to be a particularly convenient mode of application. The pretreated parts may be utilized immediately after drying or stored for later use. Although there is sometimes a loss in the effectiveness of the accelerator in the resulting film, generally the pretreated parts may be stored for several days without significant loss in effectiveness.

Indicative of this fact is Table 5 wherein the nuts and bolts were initially treated in the preferred solution set forth above. Some of the nuts and bolts were assembled immediately with the sealant composition and others were stored in the air at room temperature for three days, after which time they were assembled with the sealant formulation.

TABLE 5

| Time of set, minutes | Prevailing torque, foot pounds | |
| --- | --- | --- |
| | Initially assembled | Stored |
| 5 | 4.5 | 8.0 |
| 10 | 7.5 | 7.5 |
| 20 | 13.5 | 14.0 |

When the polyamino accelerator is employed in a pretreating solution, other types of accelerators may be employed in the monomer-catalyst component of the system for a duplex activity, although there is a tendency for the activity to be reduced by some types of accelerators. Also, it may be desirable to reduce the shear strength ultimately produced by the system through the use of suitable diluents, particularly for use on softer metals such as aluminum and copper or when the engagement ratio is high.

Although the catalyst-monomer mixture normally may be applied by penetration between the mating or adjacent surfaces in assembled relationship through capillary action, this property is greatly reduced by the tendency of the sealant to cure almost instantaneously upon contact with the accelerator, thus often greatly reducing the depth of penetration. Accordingly, it is preferable to apply the sealant to the parts prior to assembly by depositing a few drops on the surface and allowing the mixture to spread out, or by tumbling or by spraying. Generally, it is desired to have a thin liquid of low viscosity exhibiting good capillary action for bonding closely fitting surfaces or for bonding previously assembled parts by penetration or wicking between the mating surfaces. However, for loosely fitting surfaces or for filling large spaces or voids, sealant compositions of high viscosity are preferable.

As a measure of the activity of the sealant system, several simple tests are available. In one test, several drops of the system may be placed between two elongate plates of glass or metal, or of glass and metal, preferably at right angles to each other. When it is possible to move the two plates as a unit by manipulating one of the plates, it is evident that polymerization has taken place. A more quantitative test is provided by subjecting the plates to shear stress to determine the shear strength of the bond.

In another test, the strength of the bond between threaded members is determined by placing several drops of the sealant system in the mating threads of a nut and bolt, tightening the nut to a predetermined torque, and allowing the sealant system to set and cure, generally at room temperature. In some instances, the break-loose torque is noted, but more conventionally the prevailing torque is the measure of bond strength. To obtain the prevailing torque for the bond, the torque required to turn the bolt or screw at several, usually four or five, points after the break-loose torque and up to one full turn are averaged. For example, the torques required at ¼, ½, ¾ and 1 turn are taken and averaged. Commercially, a bolt adhesive developing a prevailing torque of one foot pound on ⅜ inch full nut is considered satisfactory.

Example 1

An accelerator composition was prepared by admixing 0.5 cc. of 1,2-propane diamine, 1.4 cc. of 2-ethyl hexanoic acid, 3.0 cc. of 1,2-propylene glycol, 30.0 cc. butanol and 65.1 cc. trichloroethylene. This accelerator composition was heat aged at 60° C. and evidenced no discoloration, precipitation or other signs of deterioration even after sixty days at the elevated temperature indicating its extended shelf life at ambient temperatures. This composition was sprayed onto the threads of ⅜ inch nuts and bolts, after which they were allowed to dry for a period of approximately twenty minutes.

A few drops of a formulation containing 7.0 percent by weight cumene hydroperoxide, 2.0 percent by weight triethylamine and tetraethylene glycol dimethacrylate were placed upon the threads of the dried nuts and bolts. The nuts and bolts were then assembled and allowed to stand at room temperature. At the end of five minutes, the available prevailing torque was 6 foot pounds, at the end of ten minutes was 7.7 foot pounds, and at the end of twenty minutes was 12.2 foot pounds.

The same sealant formulation when applied to similar nuts and bolts which had been pretreated with the accelerator composition developed no torque at the end of five minutes, ten minutes and twenty minutes, but exhibited a prevailing torque of 10 foot pounds at the end of three hours.

Example 2

Two additional accelerator compositions were prepared identical with that in Example 1 with the exception that in one an equivalent amount of methanol was substituted for the butanol, and in the other, an equivalent amount of propanol was substituted for the butanol.

When subjected to heat aging at 60° C., the formulation containing methanol exhibited no color change or other evidence of deterioration even at the end of sixty days. The formulation containing propanol turned dark after forty days, but no precipitate or other deterioration was indicated at the end of sixty days and the formulation was found to have maintained its activity.

These two formulations were tested similarly to that in Example 1 by spraying upon the threads of ⅜ inch nuts and bolts and subsequent application of the sealant formulation indicated in Example 1.

The methanol formulation developed a prevailing torque of 9 foot pounds at the end of five minutes, 9.2 foot pounds at the end of ten minutes and 11.1 foot pounds at the end of twenty minutes.

The propanol formulation developed a prevailing torque of 11.5 foot pounds at the end of five minutes, 10.5 foot pounds at the end of ten minutes, and 10.5 foot pounds at the end of twenty minutes.

Example 3

An accelerator composition was prepared by admixing 0.75 cc. of 1,2-propane diamine, 4.4 cc. of 2-ethyl hexanoic acid, 30.0 cc. of ispropyl alcohol and 65.0 cc. of trichloroethylene. This composition was used as a bath in which ⅜ inch nuts and bolts were initially washed, after which they were then dried.

A few drops of a formulation containing 7.0 percent by weight cumene hydroperoxide, 2.0 percent by weight triethylamine and tetraethylene glycol dimethacrylate were placed upon the threads of the dried nuts and bolts which were assembled and allowed to stand at room temperature.

At the end of five minutes, the average prevailing torque was 18 foot pounds.

Example 4

An accelerator composition was prepared by admixing 0.375 cc. of 1,2-propane diamine, 1.1 cc. 2-ethyl hexanoic acid, 15.0 cc. isopropyl alcohol and 83.5 cc. of trichloroethylene.

In the test procedure in Example 1, the prevailing torque was 9 foot pounds in five minutes and 15 foot pounds in fifteen minutes.

Example 5

An accelerated catalyst-monomer sealant system was admixed prior to application to the parts from 7.0 percent by weight cumene hydroperoxide, 2.0 percent by weight N,N-diethyl 1,3-diaminopropane, 0.2 percent by weight acetic anhydride and tetraethylene glycol dimethacrylate.

When a few drops were placed upon the threads of ⅜ inch nuts and bolts, the following prevailing torques were obtained at the end of the indicated times at room temperature:

| Time, minutes: | Torque, foot pounds (avg.) |
| --- | --- |
| 5 | 6¼ |
| 10 | 13 |
| 15 | 9½ |

A separate sealant was prepared using only 2.0 percent by weight of cumene hydroperoxide which developed a prevailing torque (average) of 1 foot pound at the end of five minutes, 6½ foot pounds at the end of ten minutes and 6 foot pounds at the end of fifteen minutes.

Example 6

A similar sealant system was prepared to determine the effect of storage upon the accelerated anaerobic curing characteristics. The composition was a mixture of 7.0 percent by weight cumene hydroperoxide, 2.0 percent by weight N,N-diethyl 1,3-propanediamine and tetraethylene glycol dimethacrylate.

When a few drops were placed upon the threads of ⅜ inch nuts and bolts at the time of formulation, a prevailing torque of 13 foot pounds was developed after ten minutes. After twenty-four hours' storage in a polyethylene bottle in the presence of air, the mixture developed only 6½ foot pounds at the end of thirty minutes; after two weeks' storage, curing for a period of three hours was necessary before a torque of 7 foot pounds was developed.

Example 7

An accelerator formulation was prepared by admixing 0.25 cc. of triethylene tetramine in 25 cc. of trichloroethylene. Nuts and bolts (⅜ inch) were washed in the formulation, dried and then treated in accordance with Example 1.

At the end of ten minutes, the prevailing torque was 11¾ foot pounds.

Example 8

A similar formulation was prepared by admixing 0.25 cc. 3,3'-diaminodipropylamine, 0.5 cc. 2-ethyl hexanoic acid and 25 cc. trichloroethylene.

Nuts and bolts similarly washed and treated with the sealant mixture produced a prevailing torque of 3 foot pounds at the end of twenty minutes.

Example 9

A similar formulation was prepared by admixing 0.25 cc. of 1,3-propane diamine, 1.0 cc. of 2-ethyl hexanoic acid and 25.0 cc. of trichloroethylene.

Nuts and bolts similarly washed in the formulation and treated with sealant mixture produced a prevailing torque of 2 foot pounds in ten minutes and 5 foot pounds in twenty minutes.

*Example 10*

A similar formulation was prepared by admixing 0.25 cc. of ethylene diamine in 25.0 cc. of trichloroethylene. Nuts and bolts similarly treated therewith developed a prevailing torque of 3 foot pounds in ten minutes.

To a separate sample of the above formulation was added 1.0 cc. of 2-ethyl hexanoic acid. This formulation resulted in a prevailing torque of 7 foot pounds in ten minutes.

*Example 11*

A series of similar formulations were prepared using varying volume percentages of tetraethylene pentamine in trichloroethylene.

The prevailing torques developed at the end of twenty minutes by prerinsing the nuts and bolts therein and following the procedure of Example 1 are set forth below:

| Accelerator, percent by volume: | Torque, foot pounds |
|---|---|
| 20 | 2 |
| 10 | 3 |
| 5 | 4 |

*Example 12*

A formulation containing 1.28 grams of tetraethylene pentamine in 100 cc. of trichloroethylene was prepared.

A portion of this formulation was diluted 100 percent by the addition of trichloroethylene.

To 20 cc. of the diluted formulation was added 1.0 cc. 2-ethyl hexanoic acid.

Following the procedure of Example 1, at the end of five minutes the first formulation produced a prevailing torque of 3 foot pounds; the second produced 5½ foot pounds, and the third produced 9 foot pounds.

*Example 13*

A sealant system was admixed prior to application to the parts containing 7.0 percent by weight cumene hydroperoxide, 1.0 percent by weight triethylamine, 0.1 percent by weight N,N-diethyl 1,3-propane diamine, 0.2 percent by weight acetic anhydride and tetrethylene glycol dimethacrylate.

A second sealant system as above was admixed containing 2.0 percent by weight of the polyamino compound and no triethylamine.

A few drops of the first sealant system produced a prevailing torque of 1 foot pound at the end of thirty minutes and 8 foot pounds at one hour. In the second sealant system which contained no triethylamine, a prevailing torque of 2 foot pounds was developed in five minutes and 8½ foot pounds in fifteen minutes.

*Example 14*

A sealant system was admixed prior to application to the parts containing 7.0 percent by weight cumene hydroperoxide, 2.0 percent by weight 2(2-aminoethylamino) ethanol, 0.2 percent by weight acetic anhydride, and tetraethylene glycol dimethacrylate.

A few drops of this system produced a prevailing torque of 1 foot pound in ten minutes.

*Example 15*

A sealant system was admixed prior to application to the parts containing 2.0 percent by weight, 3,3'-diaminodipropylamine, 7.0 percent by weight cumene hydroperoxide, 0.2 percent by weight acetic anhydride, and tetraethylene glycol dimethacrylate.

A few drops of the sealant system produced a prevailing torque of 16 foot pounds in ten minutes.

*Example 16*

A sealant system containing 7.0 percent by weight cumene hydroperoxide, 2.0 percent by weight N,N-diethyl 1,3-propanediamine and tetraethylene glycol dimethacrylate was prepared.

To a portion of this sealant system was added 0.2 percent by weight of formic acid, and to a second portion was added 2.0 percent by weight formic acid and 2.0 percent by weight formamide.

The first sealant system produced a prevailing torque of 13 foot pounds in ten minutes; the second 8¼ foot pounds; and the third, 13½ foot pounds.

It can be seen from the foregoing specification and the specific examples that the present invention provides a novel, highly accelerated anaerobic curing sealant system with apparent advantages for rapid bonding of adjacent surfaces, particularly in assembly-line operation.

As will be readily apparent to persons skilled in the art, various modifications and adaptations may be effected without departing form the spirit and scope of the invention.

I claim:

1. A single phase organic sealant system having accelerated anaerobic curing properties comprising an anaerobic curing sealant component having extended shelf life when exposed to oxygen but capable of setting up in a relatively brief time when excluded from contact with oxygen and a shelf stable accelerator component for admixture with said sealant component to thereby effectuate said single phase system, said anaerobic curing sealant component comprising a monomer corresponding to the general formula:

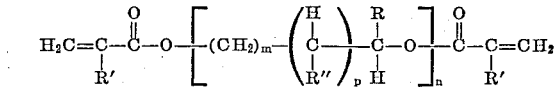

wherein R is a member selected from the class consisting of hydrogen, $—CH_3$, $—C_2H_5$, $—CH_2OH$ and

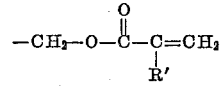

radicals, R' is a member selected from the class consisting of hydrogen, chlorine and methyl and ethyl radicals, R" is a member selected from the class consisting of hydrogen, —OH radical and

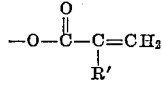

radical, m is an integer equal to at least 1, n is an integer equal to at least 1, and p is one of the following: 0, 1; and 0.01 to 20 percent by weight of a catalyst selected from the group consisting of hydrogen peroxide and organic hydroperoxides, said catalyst being present in an amount sufficient to polymerize said monomer at room temperature upon the exclusion of oxygen; said accelerator component comprising 0.01 to 10 percent by weight of a polyamino compound in a substantially volatile organic vehicle therefor, said polyamino compound corresponding to the general formula:

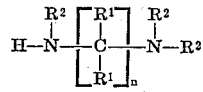

wherein n is an integer equal to from 2 to 3 inclusive, $R^1$ is a member selected from the class consisting of hydrogen and alkyl groups and $R^2$ is a member selected from the class consisting of hydrogen, alkyl, hydroxy alkyl and amino alkyl groups, said amino alkyl group being represented by the formula: $—(R^3—NH)_xH$ wherein $R^3$ is an alkylene radical and x is an integer from 1 to 3 inclusive.

2. A single phase organic sealant system in accordance with claim 1 wherein the symbol $n$ of the general formula for the polyamino compound is equal to 2.

3. A single phase organic sealant system in accordance with claim 1 wherein said system additionally contains an organic acid in an amount sufficient to provide 0.01 to 4.0 acid equivalents of said polyamino compound.

4. A single phase organic sealant system in accordance with claim 1 wherein said organic vehicle contains at least 0.1 percent by weight of dihydric alcohol.

5. A single phase organic sealant system in accordance with claim 1 wherein said organic vehicle contains at least one percent of a low molecular weight alcohol.

6. An organic composition for accelerating the curing of an anaerobic curing single phase catalyst-monomer mixture, said mixture comprising a monomer corresponding to the general formula:

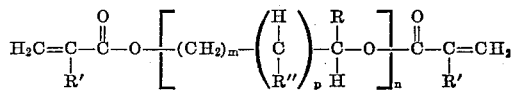

where R is a member selected from the class consisting of hydrogen, —CH$_3$, —C$_2$H$_5$, —CH$_2$OH and

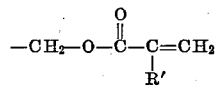

radicals, R' is a member selected from the class consisting of hydrogen, chlorine and methyl and ethyl radicals, R'' is a member selected from the class consisting of hydrogen, —OH radical and

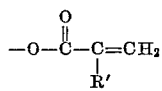

radical; $m$ is an integer equal to at least 1; $n$ is an integer equal to at least 1; and $p$ is one of the following: 0, 1; and a catalyst selected from the group consisting of organic hydroperoxides and hydrogen peroxide; said organic accelerator composition comprising a polyamino compound corresponding to the general formula:

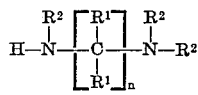

wherein $n$ is an integer equal to from 2 to 3 inclusive, R$^1$ is a member selected from the class consisting of hydrogen and alkyl groups, and R$^2$ is a member selected from the class consisting of hydrogen, alkyl, hydroxy alkyl and amino alkyl groups, said amino alkyl group being represented by the formula: —(R$^3$—NH)$_x$H wherein R$^3$ is an alkylene radical and $x$ is an integer from 1 to 3 inclusive; and an organic liquid vehicle therefor containing at least 0.1 percent by weight of a dihydric alcohol, said liquid vehicle vaporizing readily upon exposure to air to deposit a film of said polyamino compound upon the surface of an article to which applied.

7. A composition in accordance with claim 6 wherein the symbol $n$ in the general formula for said polyamino compound is equal to the integer 2.

8. An organic composition for accelerating the curing of an anaerobic curing single phase catalyst-monomer mixture, said mixture comprising a monomer corresponding to the general formula:

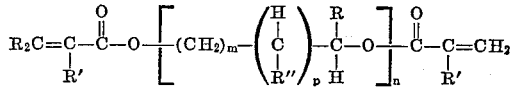

where R is a member selected from the class consisting of hydrogen, —CH$_3$, —C$_2$H$_5$, —CH$_2$OH and

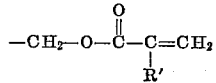

radicals, R' is a member selected from the class consisting of hydrogen, chlorine and methyl and ethyl radicals, R'' is a member selected from the class consisting of hydrogen, —OH radical and

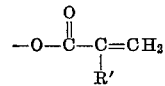

radical; $m$ is an integer equal to at least 1; $n$ is an integer equal to at least 1; and $p$ is one of the following: 0, 1; a catalyst selected from the group consisting of organic hydroperoxides and hydrogen peroxide; said organic accelerator composition having extended shelf stability and comprising 0.01 to 10.0 percent by weight of a polyamino compound corresponding to the general formula:

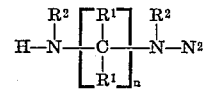

wherein $n$ is an integer equal to from 2 to 3 inclusive, R$^1$ is a member selected from the class consisting of hydrogen and alkyl groups, and R$^2$ is a member selected from the class consisting of hydrogen, alkyl, hydroxy alkyl and amino alkyl groups, said amino alkyl group being represented by the formula: —(R$^3$—NH)$_x$H wherein R$^3$ is an alkylene radical and $x$ is an integer from 1 to 3 inclusive; an organic acid in an amount sufficient to provide 0.1 to 4.0 acid equivalents of said polyamino compound; and an organic liquid vehicle for said polyamino compound and organic acid, said vehicle containing essentially at least 1.0 percent by weight of a C$_1$—C$_5$ monohydric alcohol and 0.25 to 5.0 percent by weight of a dihydric alcohol, said liquid vehicle vaporizing readily upon exposure to air to deposit a film of said polyamino compound upon the surface of an article to which applied.

9. An organic composition for accelerating the curing of an anaerobic curing single phase catalyst-monomer mixture, said mixture comprising a monomer corresponding to the general formula:

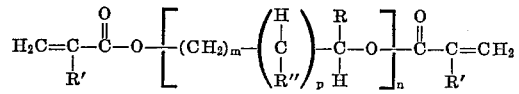

where R is a member selected from the class consisting of hydrogen, —CH$_3$, —C$_2$H$_5$, —CH$_2$OH and

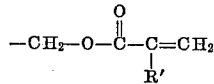

radicals, R' is a member selected from the class consisting of hydrogen, chlorine and methyl and ethyl radicals, R'' is a member selected from the class consisting of hydrogen, —OH radical and

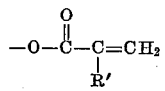

radical; $m$ is an integer equal to at least 1; $n$ is an integer equal to at least 1; and $p$ is one of the following: 0, 1; and a catalyst selected from the group consisting of hydrogen peroxide and organic hydroperoxides; said organic accelerator composition comprising 0.1 to 2.0 percent by weight of a polyamino compound corresponding to the general formula:

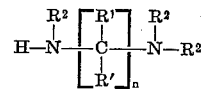

wherein $n$ is an integer equal to from 2 to 3 inclusive, R$^1$ is a member selected from the class consisting of hydrogen and alkyl groups, and R$^2$ is a member selected from the class consisting of hydrogen, alkyl, hydroxy alkyl and amino alkyl groups, said amino alkyl group being represented by the formula: —(R³—NH)ₓH wherein R³ is an alkylene radical and x is an integer from 1 to 3 inclusive; an organic acid in an amount sufficient to provide about 0.5 to 1.5 acid equivalent of said polyamino compound; and an organic liquid vehicle therefor containing about 20 to 50 percent by weight of C₁-C₅ monohydric alcohol, about 1.0 to 5.0 percent by weight of a dihydric alcohol, and a volatile liquid halogenated hydrocarbon grease solvent, said organic vehicle vaporizing readily upon exposure to air to deposit a thin film of said polyamino compound and acid upon the surface of an article to which applied.

10. A composition in accordance with claim 9 wherein said accelerator composition additionally contains as an activator a minor amount of polyvalent heavy metal ion.

11. The method for bonding a pair of adjacent surfaces comprising depositing a single phase organic sealant system between adjacent surfaces to the exclusion of air, said sealant system comprising an anaerobic curing sealant component having extended shelf life when exposed to oxygen but capable of setting up in a relatively brief time when excluded from contact with oxygen containing essentially an unoxygenated monomer corresponding to the general formula:

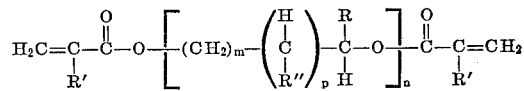

where R is a member selected from the class consisting of hydrogen, —CH₃, —C₂H₅, —CH₂OH and

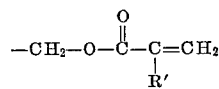

radicals, R' is a member selected from the class consisting of hydrogen, chlorine and methyl and ethyl radicals, R" is a member selected from the class consisting of hydrogen, —OH radical and

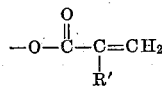

radical; m is an integer equal to at least 1; n is an integer equal to at least 1; and p is one of the following: 0, 1; 0.01 to 20 percent by weight, of a catalyst selected from the group consisting of hydrogen peroxide and organic hydroperoxide; and an accelerator component containing essentially a polyamino compound in an amount sufficient to constitute 0.01 to 10.0 percent by weight of said sealant system, said polyamino compound corresponding to the general formula:

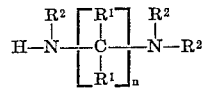

wherein n is an integer equal to from 2 to 3 inclusive, R¹ is a member selected from the class consisting of hydrogen and alkyl groups and R² is a member selected from the class consisting of hydrogen, alkyl, hydroxy alkyl and amino alkyl groups, said amino alkyl group being represented by the formula: —(R³—NH)ₓH wherein R³ is an alkylene radical and x is an integer from 1 to 3 inclusive.

12. The method in accordance with claim 11 wherein the symbol n in the general formula for said polyamino compound is equal to 2.

13. The method in accordance with claim 11 wherein said sealant system additionally contains organic acid in an amount sufficient to provide 0.1 to 4.0 acid equivalents of said polyamino compound.

14. A method for the bonding of a pair of adjacent surfaces comprising: applying to at least one of a pair of adjacent surfaces to be bonded a solution containing essentially a polyamino compound in a volatile organic vehicle therefor to develop a film thereon of said polyamino compound, said polyamino compound corresponding to the general formula:

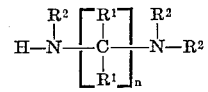

wherein n is an integer equal to from 2 to 3 inclusive, R¹ is a member selected from the class consisting of hydrogen and alkyl groups, and R² is a member selected from the class consisting of hydrogen, alkyl, hydroxy alkyl and amino alkyl groups, said amino alkyl group being represented by the formula: —(R³—NH)ₓH wherein R³ is an alkylene radical and x is an integer from 1 to 3 inclusive; and thereafter causing an anaerobic curing sealant component to contact and admix with said film in a single phase between the assembled adjacent surfaces and polymerize in situ, said sealant composition having extended shelf life when exposed to oxygen but polymerizable rapidly upon the exclusion of oxygen and comprising in admixture a monomer corresponding to the general formula:

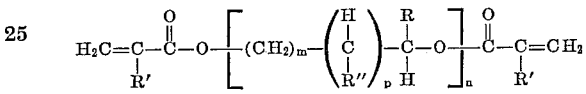

where R is a member selected from the class consisting of hydrogen, —CH₃, —C₂H₅, —CH₂OH and

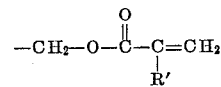

radicals, R' is a member selected from the class consisting of hydrogen, chlorine and methyl and ethyl radicals, R" is a member selected from the class consisting of hydrogen, —OH radical and

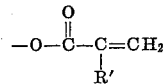

radical; m is an integer equal to at least 1; n is an integer equal to at least 1; and p is one of the following; 0, 1; and 0.01 to 20 percent, sufficient to polymerize said monomer at room temperature upon the exclusion of oxygen, of a catalyst selected from the group consisting of organic hydroperoxides and hydrogen peroxide.

15. The method in accordance with claim 14 wherein said solution is applied to one of said adjacent surfaces and wherein said sealant component is applied to the other of said adjacent surfaces prior to assembly thereof, said coating and composition coming into contact and admixing upon assembly thereof.

16. The method in accordance with claim 14 wherein said sealant component is applied to said adjacent surfaces subsequent to assembly and penetrates therebetween.

17. In the method of bonding adjacent surfaces by means of an intermediately disposed single phase organic sealant composition rapidly polymerizable upon the exclusion of oxygen and comprising in admixture a monomer corresponding to the general formula:

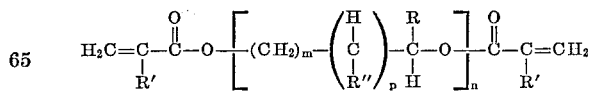

where R is a member selected from the class consisting of hydrogen, —CH₃, —C₂H₅, —CH₂OH, and

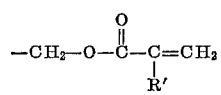

radicals, R' is a member selected from the class consisting of hydrogen, chlorine and methyl and ethyl radicals, R"

is a member selected from the class consisting of hydrogen, —OH radical and

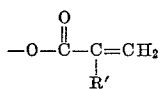

radical; $m$ is an integer equal to at least 1; $n$ is an integer equal to at least 1; and $p$ is one of the following; 0, 1; and 0.01 to 20 percent by weight of a catalyst selected from the group consisting of hydrogen peroxide and organic hydroperoxides sufficient to polymerize said monomer at room temperature upon the exclusion of oxygen, the step comprising admixing in situ with said sealant composition an accelerator corresponding to the general formula:

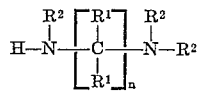

wherein $n$ is an integer equal to from 2 to 3 inclusive, $R^1$ is a member selected from the class consisting of hydrogen and alkyl groups, and $R^2$ is a member selected from the class consisting of hydrogen, alkyl, hydroxy alkyl and amino alkyl groups, said amino alkyl group being represented by the formula: $-(R^3-NH)_xH$ wherein $R^3$ is an alkylene radical and $x$ is an integer from 1 to 3 inclusive.

References Cited by the Examiner
UNITED STATES PATENTS

| | | | |
|---|---|---|---|
| 2,584,773 | 2/52 | Reynolds et al. | 260—80.3 |
| 2,628,178 | 2/53 | Burnett et al. | 260—89.5 |
| 3,043,820 | 7/62 | Krieble | 260—89.5 |

JOSEPH L. SCHOFER, *Primary Examiner.*

JOSEPH R. LIBERMAN, *Examiner.*